UNITED STATES PATENT OFFICE.

MORGAN W. BROWN, OF NEW YORK, N. Y.

IMPROVEMENT IN COVERINGS FOR SAUSAGES AND OTHER MEATS.

Specification forming part of Letters Patent No. 113,396, dated April 4, 1871.

*To all whom it may concern:*

Be it known that I, MORGAN W. BROWN, of the city, county, and State of New York, have invented a new and Improved Integument for Sausages and other Meats; and I do hereby declare the following to be a full, clear, and exact description thereof, which will enable those skilled in the art to make and use the same.

This invention consists in an integument for sausages, meat, or extract of meat, made of chemically-prepared paper, said paper being treated with a compound of glycerine and an alkali, or with any other material capable of rendering the same impervious to air, water, or fat, while at the same time the paper is rendered tough and flexible in such a manner that the same has the appearance of natural skin, and that it can be readily brought in the required form or shape to receive the sausages or other meat.

In carrying out my present improvement I treat the paper, by preference, with a compound of glycerine and caustic potash, or with any other compound which will have a similar effect, so as to render the same semi-transparent, tough, and pliable, and at the same time impervious to air, water, or fat.

The paper thus prepared I form into tubes or cases of the requisite form and capacity, the ends of the paper being united by a suitable cement, and the tubes thus formed I charge with minced meat in the same manner in which ordinary skins are charged in the manufacture of sausages; or, instead of charging said bags with sausage-meat, I can also use them as integuments for cured meat of any desired kind, or for extract of meat.

An integument of paper prepared as above stated is much cheaper than skins or intestines generally used for integuments of sausages, and it serves the same purpose in every respect; it excludes air or moisture; it is impervious to water; and it can easily be tied at its ends by cords, the paper, when prepared as above described, being perfectly pliable and tough, like skin.

What I claim as new, and desire to secure by Letters Patent, is—

A case or integument for sausages or other meats or extracts of meats made of paper prepared as herein described.

MORGAN W. BROWN.

Witnesses:
 W. HAUFF,
 E. F. KASTENHUBER.